(12) United States Patent
Wei et al.

(10) Patent No.: US 7,929,380 B2
(45) Date of Patent: Apr. 19, 2011

(54) APPARATUS AND METHOD FOR GENERATING A SEISMIC SOURCE SIGNAL

(75) Inventors: Zhouhong Wei, Stafford, TX (US); John Sallas, Plano, TX (US)

(73) Assignee: Inova Ltd., George Town, Grand Cayman (KY)

( * ) Notice: Subject to any disclaimer, the term of this patent is extended or adjusted under 35 U.S.C. 154(b) by 618 days.

(21) Appl. No.: 11/691,925

(22) Filed: Mar. 27, 2007

(65) Prior Publication Data

US 2007/0250269 A1    Oct. 25, 2007

Related U.S. Application Data

(60) Provisional application No. 60/786,224, filed on Mar. 27, 2006, provisional application No. 60/825,285, filed on Sep. 12, 2006.

(51) Int. Cl.
*G01V 1/04* (2006.01)
(52) U.S. Cl. ......................................................... 367/190
(58) Field of Classification Search .................. 367/189, 367/190; 181/121
See application file for complete search history.

(56) References Cited

U.S. PATENT DOCUMENTS

| | | | |
|---|---|---|---|
| 3,216,525 A * | 11/1965 | Fail et al. ....................... | 367/190 |
| 3,795,286 A * | 3/1974 | Meyer ............................ | 367/190 |
| 4,049,077 A * | 9/1977 | Mifsud .......................... | 181/114 |
| 4,103,756 A | 8/1978 | Trulio et al. | |
| 4,336,745 A | 6/1982 | Lund | |
| 4,519,053 A * | 5/1985 | Bedenbender ................ | 367/190 |
| 4,637,002 A | 1/1987 | Sallas | |
| 4,718,049 A | 1/1988 | Crowell et al. | |
| 5,005,665 A | 4/1991 | Cheung | |
| 5,128,908 A * | 7/1992 | Reust ............................. | 367/190 |
| 5,401,919 A | 3/1995 | Crowell et al. | |
| 5,666,328 A | 9/1997 | Crowell et al. | |
| 6,065,562 A | 5/2000 | Bird et al. | |
| 6,152,256 A | 11/2000 | Favret et al. | |
| 6,338,394 B1 | 1/2002 | Meynier | |
| 6,552,961 B1 | 4/2003 | Bremner et al. | |
| 6,561,310 B2 | 5/2003 | Hoover | |
| 6,671,224 B1 | 12/2003 | Pabon | |
| 7,411,863 B2 * | 8/2008 | Toennessen ................... | 367/20 |
| 2005/0252711 A1 | 11/2005 | Rau | |

OTHER PUBLICATIONS

Alleyne, Andrew et al., "Nonlinear Adaptive Control of Active Suspensions," IEEE Transactions on Control Systems Technology, Mar. 1995, vol. 3, No. 1; pp. 94-101.

Garagic, Denis et al., "Application of Nonlinear Adaptive Control Techniques to an Electrohydraulic Velocity Servomechanism," IEEE Transactions on Control Systems Technology, Mar. 2004, vol. 12, No. 2; pp. 303-314.

(Continued)

*Primary Examiner* — Jack Keith
*Assistant Examiner* — Krystine Breier
(74) *Attorney, Agent, or Firm* — Wong, Cabello, Lutch, Rutherford & Brucculeri LLP

(57) ABSTRACT

A seismic source signal generator having feed-forward control having pressure, current and/or valve position sensors that detect system component parameters. Initial and operating parameters are processed during source operation to remove, partially or wholly, harmonic distortions from the seismic source signal.

52 Claims, 5 Drawing Sheets

OTHER PUBLICATIONS

Liu, Rui, "Nonlinear Control of Electro-hydraulic Servosystems: Theory and Experiment," Tsinghua University, 1994; pp. 1-122, Urbana, Illinois, USA.

Rajamani, Rajesh et al., "Adaptive Observers for Active Automotive Suspensions: Theory and Experiment," IEEE Transactions on Control Systems Technology, Mar. 1995, vol. 3, No. 1; pp. 86-93.

Sohl, Garett A. et al., "Experiments and Simulations on the Nonlinear Control of a Hydraulic Servosystem," IIEE Transactions on Control Systems Technology, Mar. 1999, vol. 7, No. 2; pp. 238-247.

PCT/US07/07525 International Search Report and Written Opinion mailing date Dec. 28, 2007.

* cited by examiner

APPARATUS AND METHOD FOR GENERATING A SEISMIC SOURCE SIGNAL

CROSS-REFERENCE TO RELATED APPLICATION

The present application claims the benefit of U.S. Provisional Application Ser. No. 60/786,224 filed on Mar. 27, 2006 and titled "Apparatus and Method for Generating a Seismic Source Signal" and of U.S. Provisional Application Ser. No. 60/825,285 filed on Sep. 12, 2006 and titled "Apparatus and Method for Generating a Seismic Source Signal" the entire disclosures of which are hereby incorporated herein by reference.

BACKGROUND

1. Technical Field

The present disclosure generally relates to seismic prospecting and in particular to methods and apparatus for generating seismic source signals with reduced signal distortions.

2. Background Information

In the oil and gas exploration industry, geophysical tools and techniques are commonly employed in order to identify a subterranean structure having potential hydrocarbon deposits. Many different techniques are used to generate a seismic signal.

Seismic vibratory energy sources have been used in the field many years. A seismic vibrator in its simplest form is merely a heavy vehicle that has the ability to shake the ground at a predetermined range of frequencies of about 2 to 100 Hz. The vibrator imparts a signal into the subsurface of the earth over a relatively long period of time, which allows for an energy level less than impulse generators such as dynamite.

The imparted energy, known as the seismic source signal or "pilot" signal, travels through the subsurface and reflects some of the energy from certain subsurface geological boundaries or layers. The reflected energy is then transmitted back to the earth's surface where it is recorded using an earth motion detector. The recorded data is processed to yield information about a location and physical properties of layers making up the subsurface.

The seismic vibrator source signal is typically a sweep signal, or simply sweep. Sweeps are sinusoidal vibrations in the 2-100 Hz range described above and having a duration on the order of 2 to 20 seconds depending on the terrain, the subsurface lithology, economic constraints and physical capabilities of the vibrator. The sinusoidal sweep can be increased in frequency overtime, which is called an "upsweep". The upsweep is the signal used typically in modern seismic exploration. Also, the sinusoidal sweep can be decreased in frequency overtime, which is called a "downsweep". The end products of the vibrator sweep are waves that propagate through the earth to return clues about the subsurface.

A problem with the typical sweep is that the signal imparted into the earth includes distortions caused by harmonic signals generated by one or more of the seismic source components, e.g. the hydraulic, mechanical and electromechanical subsystems making up the source.

The typical method of dealing with such distortions is to measure the signal imparted into the earth using a local sensor such as an accelerometer or geophone located on or close to the base plate coupling the seismic source to the earth. This measured signal is transmitted to a correlation processor, which also receives the signal from geophones or other sensors making up the seismic spread. The correlation processor uses various algorithms to distinguish wave signal data from distortions and other spurious signals. A problem with this method is that the original source signal distortion may vary making correlation difficult. Thus, the cleaner the source signal imparted into the earth the easier the correlation at the recording end of the seismic acquisition process.

SUMMARY

The present disclosure addresses one or more of the above-identified problems found in conventional seismic source generators by providing a seismic source generator generating a seismic source signal having reduced harmonic distortions.

In one aspect, the present disclosure provides a method for generating a seismic source signal comprising coupling a seismic source to the earth, initiating operation of the seismic source, processing an initial parameter of a source component using a processor, controlling the seismic source using a feed-forward signal comprising the processed initial parameter, determining an operating parameter during operation of the seismic source, processing the operating parameter using the processor to adjust the feed-forward signal, and controlling the seismic source using the adjusted feed-forward signal. An output of the seismic source includes the seismic source signal imparted into the earth with harmonic distortions generated by the source component at least partially removed from the seismic source signal.

Another aspect of the present disclosure is a seismic source signal apparatus for generating a seismic source signal. The apparatus includes a base for coupling the seismic source to the earth, a seismic source component, a sensor sensing an operating parameter of the seismic source component, a processor processing an initial parameter and processing the operating parameter during operation of the seismic source to generate a feed-forward signal. One or more controllers are used for controlling the seismic source using the feed-forward signal. An output of the seismic source includes the seismic source signal imparted into the earth with harmonic distortions generated by the source component at least partially removed from the seismic source signal.

The feed forward signal may be generated by estimating process parameters such as hydraulic pressure, valve position/displacement and/or electrical current of a control motor. These parameters may then be fed into a controller processor and processed according to one or more algorithms to generate the feed-forward signal. The feed-forward signal adjusts the system ahead of reaction mass movement.

BRIEF DESCRIPTION OF THE DRAWINGS

For detailed understanding of the present disclosure, reference should be made to the following detailed description of the several non-limiting embodiments, taken in conjunction with the accompanying drawings, in which like elements have been given like numerals and wherein.

DESCRIPTION OF EXEMPLARY EMBODIMENTS

Figure 1:
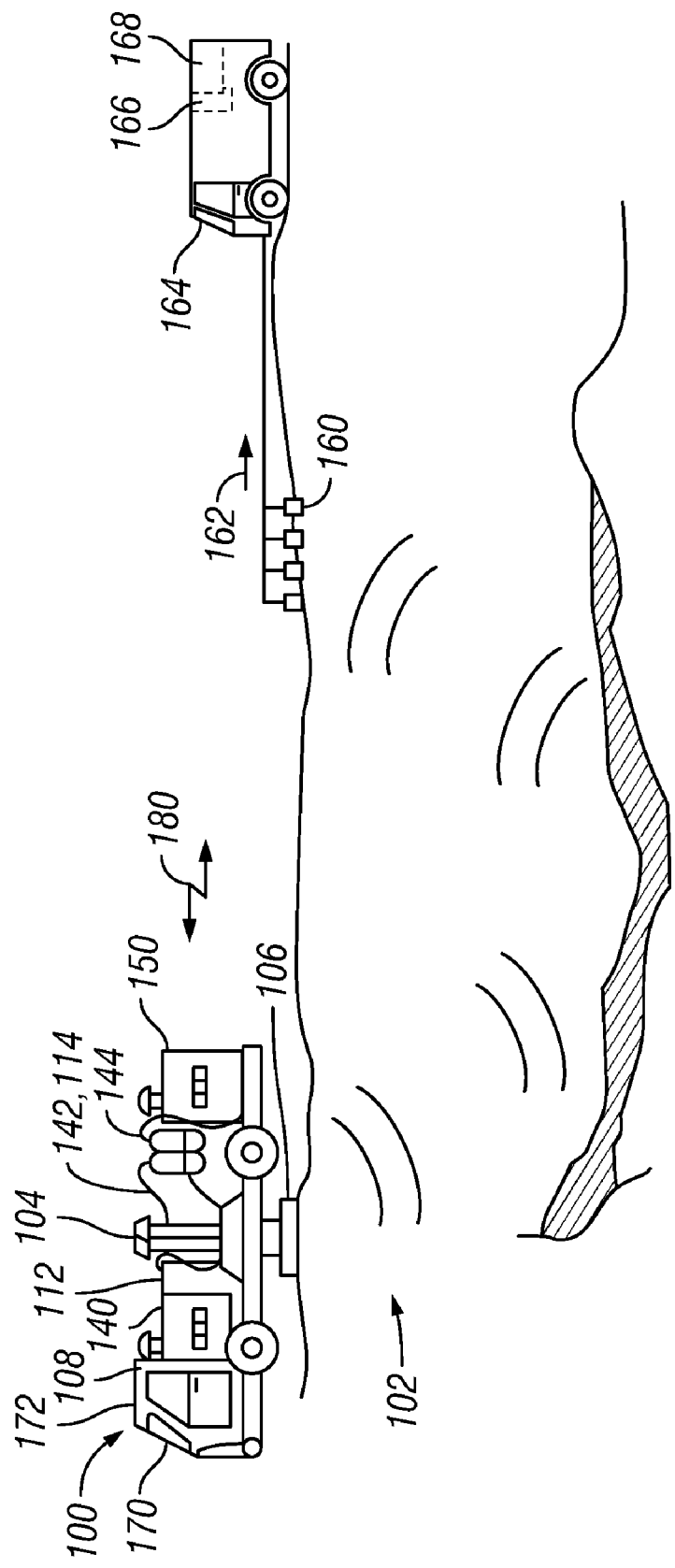
FIG. 1 illustrates a typical seismic data acquisition operation utilizing aspects of the present disclosure.

FIG. 1 depicts a geophysical survey layout incorporating several aspects of the present disclosure. A seismic source 100 is positioned at a predetermined location in an area of exploration and coupled to the earth. In the embodiment shown the seismic source 100 is a truck-carried vibratory seismic source. The vibratory seismic source 100 may be a single axis source imparting, for example, only compression P-waves into the earth. Those skilled in the art would recognize that a multi-axis vibratory source capable of imparting both P and S waves into the earth can be configured according to the present disclosure described in detail herein below without additional illustration or description. Therefore, the present disclosure will focus on a single axis seismic source for brevity and without limiting the scope of the disclosure.

The seismic source 100 includes a truck 170 having a cab 172 housing a controller 108. The seismic source includes a hydraulic subsystem 140 used to move a reaction mass 104. As will be described in more detail in reference to FIG. 2, the moving reaction mass 104 acts upon a base plate 106 to impart a seismic source signal 102 into with the earth. The signal 102 travels through the earth, reflects at discontinuities and formations and travels toward the earth's surface.

A plurality of sensors 160 are coupled to the earth in an array spaced apart from the seismic source 100. The sensors 160 detect the reflected source signal 102, and electrical signals 162, which may be digital and/or analog, are transmitted from the array of sensors 160 to a recording station 160 typically housed in a truck. The recording station includes a seismic recorder 168 and may also include a correlation processor, which also receives an electrical signal 180 indicative of the actual source signal 102 imparted into the earth.

Still referring to FIG. 1, the seismic source 100 comprises several subsystems having system components used in generating the seismic signal 102. The system 100 includes a hydraulic pump subsystem 140 having hydraulic lines 142 carrying hydraulic fluid 114 to a servo valve assembly 112. A cooler 150 is typically present to cool the hydraulic subsystem. Low frequency accumulators 144 mounted on the truck are relatively large, e.g. about ten gallons or more, and serve to dampen low frequency noise, e.g. about 25 Hz or less, caused by operation of the hydraulic system.

Figure 2:
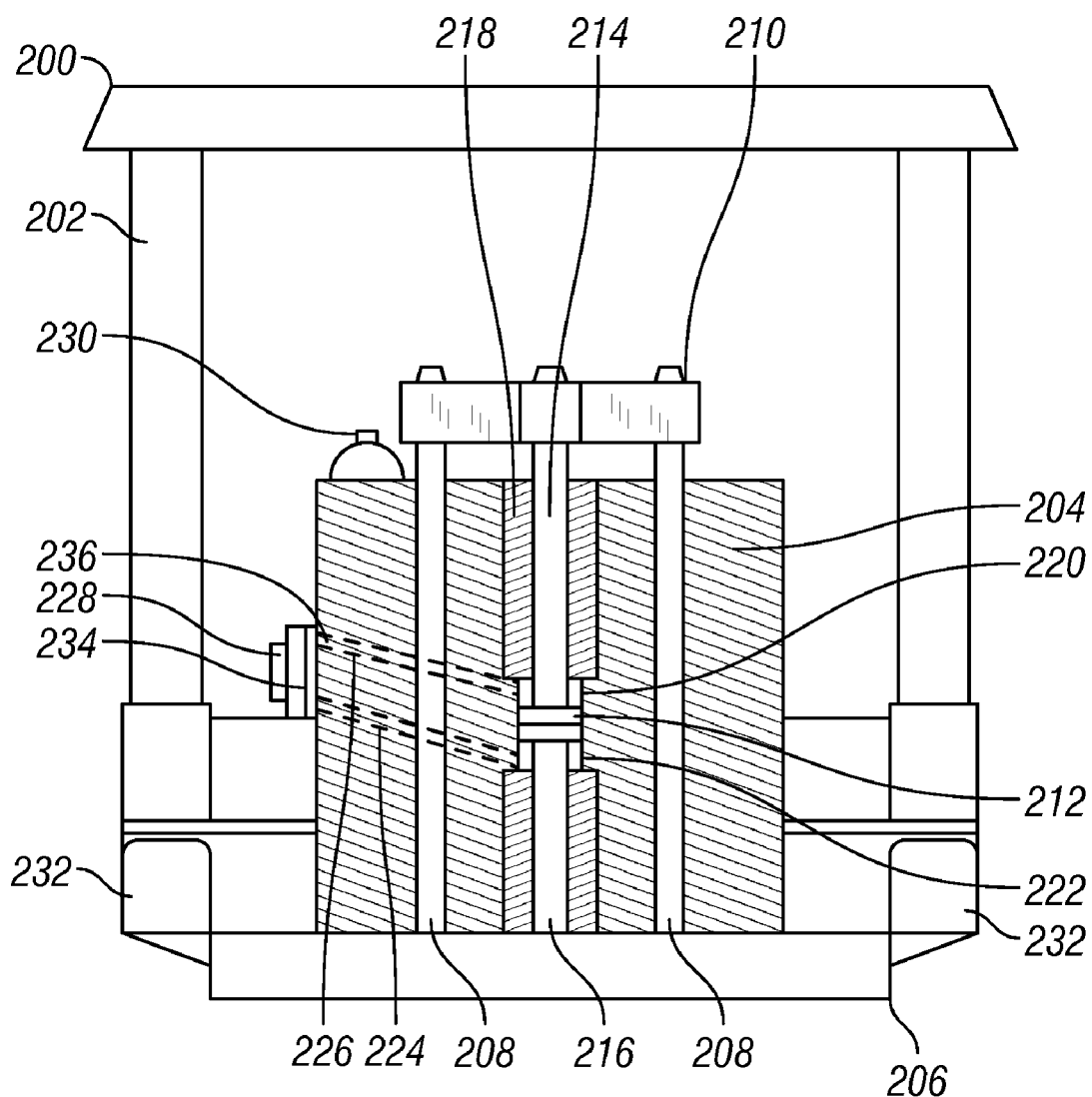
FIG. 2 is an elevation view in cross section of a vibratory source.

FIG. 2 is an elevation view in cross section of a vibratory seismic signal source 200 similar to the source 100 described above and shown in FIG. 1. The vibratory seismic signal source, or simply source 200, may be carried on a vehicle such as the truck 170 described above and shown in FIG. 1. The source 200 includes a lift mechanism assembly 202, a moveable mass 204 and a base plate 206. The mass 204 and base plate 206 may each be constructed substantially from a metal such as steel or iron. Those skilled in the art are versed in the general materials of construction, so a detailed materials list is not necessary here. The lift mechanism assembly 202 may be hydraulic, mechanical, electromechanical or any mechanism assembly useful for lowering and raising the base plate 206 to engage and disengage the ground.

A stilt structure 208 extends from the base plate 206 through the mass 204. A cross piece 210, which may be constructed from steel or iron I-beam, is coupled to a top section of the stilt structure to provide stability to the stilt structure as the mass 204 vibrates. The stilts may be tubular pipes made of steel or iron, although other shapes may be used.

A piston 212 includes opposing piston rods 214, 216 extending through the mass 204. The upper rod 214 being coupled to a hub in the cross piece 210 and the lower rod being coupled to a hub in the base plate 206. The piston 212 is slidably received in a cylinder 218 extending vertically through the mass 204. Upper and lower annular chambers 220, 222 are located immediately above and below the piston 212 and around the upper and lower piston rods 214, 216. Hydraulic fluid passages 224, 226 lead from respective chambers 220, 222 to a servo-valve assembly 228 mounted on an exterior surface of the mass 204. Alternatively, a ported spacer 234 may be mounted between the mass 204 and servo-valve assembly 228. Supply and return hydraulic lines (FIG. 1 at 142) couple the servo-valve assembly 224 and one or more small accumulators 230, which are mounted on the mass 204 close to the servo-valve assembly 228, to a hydraulic pump subsystem 140 described above and shown in FIG. 1. A pair of high frequency accumulators 230 are mounted as close as practicable to the servo-valve assembly has been found to aid in seismic source signal noise reduction. High frequency accumulators 230 relatively small, e.g. about five gallons or less, and serve to dampen high frequency noise, e.g. about 25 Hz or more, caused by operation of the servo-valve assembly 228. Pressure sensors 236 are used to measure supply hydraulic pressure, return hydraulic pressure, and hydraulic pressure to/from hydraulic passageways 224, 226 for use at least in part for control algorithms and methods according to the disclosure.

Hydraulic fluid 114 pumped to and from the cylinder chambers 220, 222 causes the mass 204 to reciprocally vibrate in a vertical direction. The force generated by the vibrating mass is transferred to the base plate 206 via the stilt structure 208 and lower piston rod 216. The vibration force is isolated from the vehicle by use of isolators 232 known in the art. The number and position of isolators are determined in part by the shape of the base plate.

Figure 3:
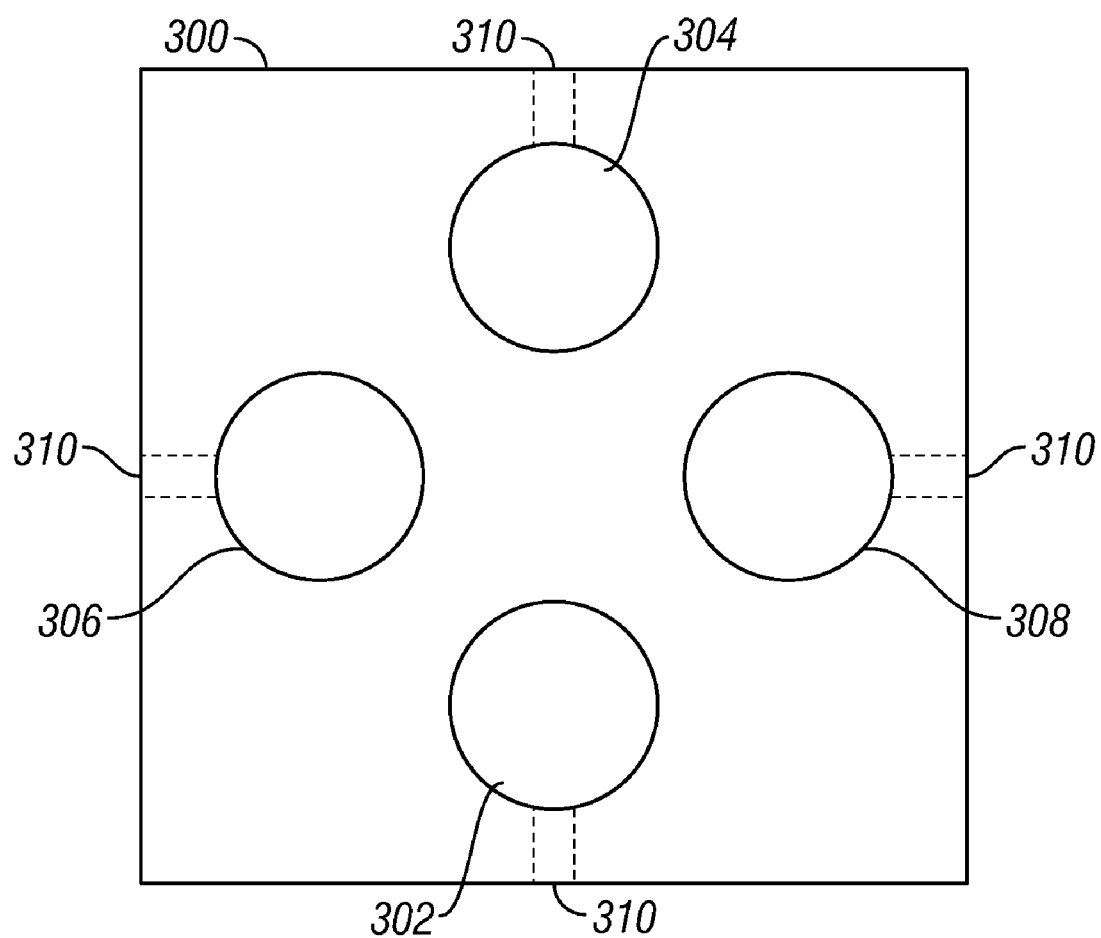
FIG. 3 is a top view of a ported spacer useful in embodiments of the present disclosure.

FIG. 3 is a top view of a ported spacer 300 useful in embodiments of the present disclosure. A servo-valve actuator such as servo valve 228 is mounted to align ports of the servo-valve to corresponding ports on the spacer 300. The spacer 300 includes a hydraulic fluid supply port 302, a hydraulic fluid system return port 304, and two hydraulic fluid mass control ports 306, 308. Passageways 310 provide fluidic coupling for pressure sensors 236, which are not separately shown in this figure. The pressure sensors 236 are used to measure supply and control pressures, which measurements are then used at least in part in methods according to the present disclosure. The sensors 236 measure pressure high-side supply pressure $P_H$ at the supply port 302, supply return pressure $P_R$ at the system return port 304, mass control pressure $P_A$ to upper chamber 220, and mass control pressure $P_B$ to lower chamber 222. The ported spacer 300 may be made of any material compatible with pressurized hydraulic fluid and with the materials comprising the mass surface and the servo-valve used. Typically a metal such as steel or iron may be used to manufacture the ported spacer by machining or by casting. A servo-valve 228 may be manufactured or modified to include passageways 310 and the pressure sensors 236 making the ported spacer an optional feature. Using a ported spacer allows for the use of a commercial off-the-shelf servo-valve without the need for special manufacturing or modification. Both embodiments, i.e. with and/or without a ported spacer, are considered within the scope of the present disclosure.

Figure 4:
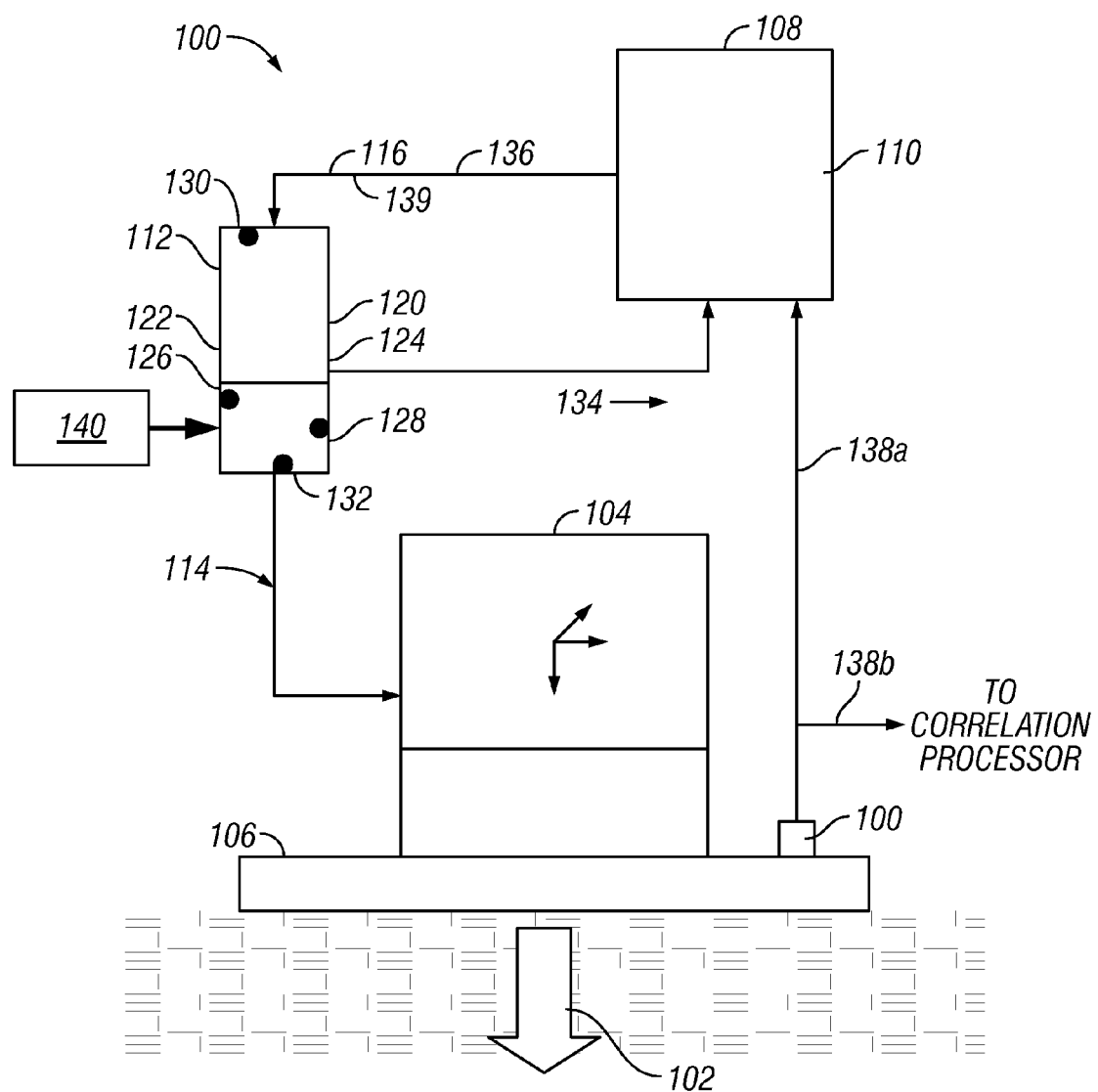
FIG. 4 is a schematic representation of functional features of a vibratory seismic source such as the source of FIG. 1.

FIG. 4 schematically illustrates a seismic signal generating system 100 substantially as described above and shown in FIGS. 1 and 2, useful for imparting a sinusoidal seismic signal 102 into the earth. Reference numerals are aligned with the like components of FIG. 1, but the schematically-illustrated components of FIG. 4 are also applicable to similar elements shown on FIG. 2 having different reference numerals, which are provided parenthetically below for clarity. The base plate 106 (206) is coupled via static weight to the earth. The reaction mass 104 (204) is movably coupled to the base plate 106 (206) such that controlled movement of the reaction mass 104 (204) via the hydraulic subsystem 140 vibrates the base plate 106 (206) at a desired amplitude and frequency or sweep to generate the signal 102. The controller 108 includes a processor 110 for controlling the system 100. The controller is electrically coupled to the servo valve assembly 112 (228). The servo valve assembly 112 (228) includes a servo motor 120, a pilot valve 122 and a main stage valve 124.

The servo valve assembly 112 (228) controls fluid movement in the hydraulic subsystem 140, which provides a force for moving the reaction mass 104 (204). An electrical signal 116 having characteristics of the desired sweep signal is transmitted from the controller 108 to the servo motor, which operates the pilot valve 122. The pilot valve 122 is coupled to the main stage valve 124 and includes a hydraulic coupling for transferring hydraulic pressure to operate the main stage valve. When operated, the main stage valve pressurizes and depressurizes hydraulic passages 226, 224 to move the reaction mass 104 (204) according to the controller signal. High frequency accumulators 230 reduce or remove servo-valve harmonic distortion of frequencies of about 25 Hz or more, typically 25-30 Hz.

As noted in the background of the disclosure, a problem associated with the typical source generator is distortions of the generated signals, which distortions are caused by characteristics of components comprising the system, e.g., the servo valve assembly 112. The servo valve assembly 112 (228) may exhibit characteristics during operation, which generate harmonic distortions in the acoustic signal imparted to the earth. These distortions affect the output of the source and thus all signals received by seismic sensors 160 are degraded.

In aspects of the disclosure the seismic signal 102 is created by regulating the flow of the pressurized hydraulic fluid 114 against the reaction mass 104, forcing the reaction mass 104 (204) to reciprocate vertically rapidly and repeatedly. Acoustic characteristics of this vibration are controlled by regulating the flow of the hydraulic fluid 114 to adjust the speed and force of the reaction mass 104.

Force and phase control may be used to reduce acoustic noise. Force and phase control may be achieved by mounting accelerometers 100 on the reaction mass 104 (204) and the base plate 106 (206) to estimate their respective motions. Once the reaction mass 104 (204) and the base plate 106 (206) are set in motion, the accelerometers 100 transmit motion estimates via signals 138a, 138b to the controller 108 and/or to the correlation processor 166. When sent to the controller 108, these motion estimates 138a serve as feedback for a force and phase control algorithm processed by the processor 110 to modify the control signal using a force and phase control signal 136. The control signal 116 modified by the force and phase control signal 136 is then transmitted to the servo-valve assembly 112 (228) for controlling the servo motor 120 to regulate flow of the hydraulic fluid 114 against the reaction mass 104 (204) and, thereby, control the phase and frequency of the seismic signal 102.

The control signal 116 provides the principal control input to the servo valve assembly 112, aspects of the disclosure include further control adjustments made using input signals from process sensors 126, 128, 130, 132. Several embodiments of the disclosure include one or more sensors measuring hydraulic fluid supply pressure $P_S$, which comprise a high-side pressure sensor $P_H$ 126, and a hydraulic fluid discharge or return pressure sensor $P_R$ 128. Pressure sensors are collectively numbered 236 in FIG. 2. A torque motor current sensor 130, and a main stage valve position indicator 132 may also be used as process sensors. The $P_S$ sensor 126 estimates the pressure of hydraulic fluid 114 supplied to the servo-valve assembly 112 (228) and the $P_R$ sensor 128 estimates hydraulic pressure discharged from the servo valve assembly 112. Electrical signals 134 from any or all of the process sensors 126, 128, 130, 132 is/are transmitted to the controller 108 and processed during operation using the processor 110. A process control signal 139 is then used as a feed-forward signal to the servo valve assembly 112. In this manner, harmonic distortions generated by the seismic source components, e.g. components making up the mechanical, hydraulic and electromechanical components of the servo valve assembly 112, can be removed partially or completely from the seismic source signal 102 prior to the reaction mass movement generating the signal 102.

Figure 5:
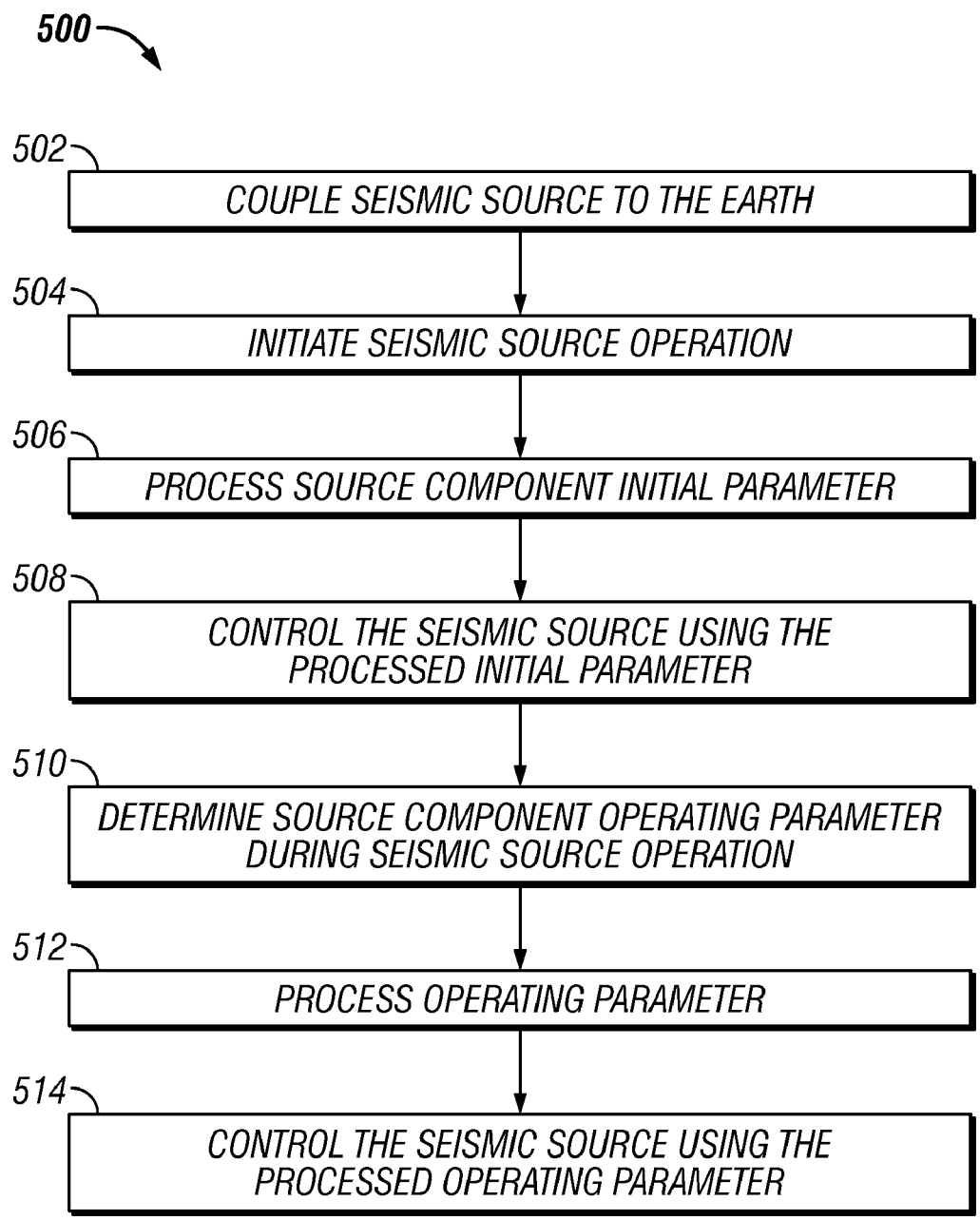
FIG. 5 is a method flow for generating a seismic source signal.

Having now described the system 100 and as shown in FIGS. 1 and 2, FIG. 5 is a flow diagram of a method according to the disclosure. Aspects of a method 300 according to the disclosure include coupling a seismic source to the earth 302, initiating seismic source operation 304, processing a source component initial parameter 306, controlling the seismic source using the processed initial parameter 308, and determining one or more operating parameters during operation of the seismic source 310. The operating parameter(s) is/are processed 312 and the seismic source is further controlled using the processed operating parameter(s).

Prior to first generating the seismic source signal 102, pressure of the hydraulic subsystem 140 is estimated for $P_H$ and $P_R$ using the sensors 126, 128 as source component initial parameters. These initial parameters may alternatively be predetermined initial parameters programmed into the controller 108 prior to initiating operation. The initial parameters are transmitted to the processor 110 for processing using a servo-valve control algorithm. The processed parameters are used to generate the control signal 139 to adjust operation of the servo motor 124 controlling the pilot valve 122 and main stage valve 124. These control adjustments remove partially or completely noise created by harmonic distortion from operating the servo-valve assembly.

A primary control algorithm for generating the primary control signal 116 according to an aspect of the disclosure is:

$$Q = K \times X_V \sqrt{\left(P_S - \left(\frac{X_V}{|X_V|}\right) \times P_L\right)}, \quad \text{Equation 1}$$

where:
Q=Hydraulic flow through the servo valve;
K=Hydraulic flow gain;
$X_v$=Servo Valve displacement;
$P_S$=Hydraulic fluid supply pressure, which comprises $P_H$-$P_R$; and
$P_L$=Hydraulic differential pressure, which comprises control pressures $P_A$-$P_B$.

The feed-forward control signal 139 may then include the reciprocal of the radical of equation 1 or:

$$C = \frac{K_2}{\left(\sqrt{P_S - \frac{X_V}{|X_V|}P_L}\right) + \varepsilon} \quad \text{Equation 2}$$

where:
C is the control gain;
$K_2$ is the square root of the difference between supply pressure $P_H$ and Return Pressure $P_R$, i.e. $\sqrt{P_H - P_R}$;
$\varepsilon$ is a small positive number that effectively limits the maximum gain; and
$P_S > |P_L|$.

The servo-valve control algorithm of Equation 2 is used to further regulate the servo-valve assembly 112 (228) by considering process feedback signals from the torque motor current sensor 134 and the main stage valve position indicator 136. This feed-forward control controls movement of the reaction mass 104 (204) at the beginning of any movement in the system 100 generating harmonic distortion. Thus, the harmonic distortion is reduced or eliminated within the seismic source system prior to the seismic source signal being imparted into the earth. In this manner, the seismic source signal is much closer to the theoretical control sweep signal 116 and correlation at the recorder is much easier.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

What is claimed is:

1. A seismic signal generation method, comprising:
    generating a primary control signal for controlling a controllable valve of a seismic source, the primary control signal operating the controllable valve, the controllable valve controlling hydraulic pressure for a hydraulic actuator of the seismic source, the hydraulic actuator generating a seismic signal;
    obtaining initial parameters at the controllable valve in advance of operation of the seismic source by determining a plurality of pressure values from a plurality of pressure sensors at the controllable valve;
    generating a feed-forward signal by processing the initial parameters obtained;
    adjusting the primary control signal for the controllable valve with the feed-forward signal; and
    generating a seismic signal with the seismic source having at least partially removed harmonic distortion by operating the controllable valve with the adjusted control signal.

2. The method of claim 1, wherein the primary control signal comprises a sinusoid signal having a variable frequency.

3. The method of claim 1, wherein the controllable valve comprises a servo valve.

4. The method of claim 1, wherein generating the seismic signal with the seismic source further comprises:
    obtaining a feedback signal indicative of relative motion between a mass and a baseplate of the seismic source, and
    adjusting the primary control signal based on the feedback signal.

5. The method of claim 1, wherein obtaining initial parameters at the controllable valve comprises:
    obtaining a first hydraulic pressure between the controllable valve and a hydraulic supply, and
    obtaining a second hydraulic pressure between the controllable valve and the hydraulic actuator.

6. The method of claim 5, wherein the first hydraulic pressure comprises:
    a first pressure measured at a supply port of the controllable valve, and
    a second pressure measured at a return port of the controllable valve.

7. The method of claim 5, wherein the second hydraulic pressure comprises:
    a first pressure measured from a first port of the controllable valve to a first chamber of the hydraulic actuator, and
    a second pressure measured from a second port of the controllable valve to a second chamber of the hydraulic actuator.

8. The method of claim 1, wherein the primary control signal is based on hydraulic flow at the controllable valve, the hydraulic flow determined by a relationship between a gain in hydraulic flow, a displacement of a valve member, a first difference in supply and return pressures, and a second difference in control pressure to chambers of the hydraulic actuator.

9. The method of claim 8, wherein the hydraulic flow is defined as $$Q = K \times X_V \sqrt{\left(P_S - \left(\frac{X_V}{|X_V|}\right) \times P_L\right)},$$

wherein Q is the hydraulic flow through the controllable valve, K is the gain in hydraulic flow, $X_V$ is the displacement of the valve member, $P_S$ is the first difference, and $P_L$, is the second difference.

10. The method of claim 1, wherein the feed-forward signal used to adjust the primary control signal is based on a gain signal, the gain signal determined by a relationship between a displacement of a valve member at the controllable valve, a first difference in supply and return pressures at the controllable valve, and a second difference in control pressures at the controllable valve to chambers of the hydraulic actuator.

11. The method of claim 10, wherein the gain signal is defined as $$C = \frac{K_2}{\left(\sqrt{P_S - \frac{X_V}{|X_V|}P_L}\right) + \varepsilon},$$

wherein C is a control gain, $K_2$ is a square root of a difference between a supply pressure and a return pressure, c is a positive number limiting a maximum gain value, $X_V$ is the displacement of the valve member, $P_S$ is the first difference, $P_L$, is the second difference, and $P_S > |P_L|$.

12. The method of claim 1, further comprising:
obtaining feedback of an operating parameter during operation of the seismic source;
readjusting the feed-forward signal based on the obtained feedback; and
controlling the seismic source using the readjusted feed-forward signal.

13. The method of claim 12, wherein obtaining feedback comprises obtaining one or more of: a current to a motor of the controllable valve, a displacement of a valve member at the controllable valve, and a current supply pressure and a current control pressure.

14. A seismic signal generation method, comprising:
generating a primary control signal for controlling a controllable valve of a seismic source, the primary control signal operating the controllable valve, the controllable valve controlling hydraulic pressure for a hydraulic actuator of the seismic source, the hydraulic actuator generating a seismic signal;
obtaining initial parameters at the controllable valve in advance of operation of the seismic source, the initial parameters including first hydraulic pressures measured between supply and return ports of the controllable valve and a hydraulic supply and including a second hydraulic pressure between the controllable valve and the hydraulic actuator;
generating a feed-forward signal by processing the initial parameters obtained;
adjusting the primary control signal for the controllable valve with the feed-forward signal; and
generating a seismic signal with the seismic source having at least partially removed harmonic distortion by operating the controllable valve with the adjusted control signal.

15. The method of claim 14, wherein the primary control signal comprises a sinusoid signal having a variable frequency.

16. The method of claim 14, wherein the controllable valve comprises a servo valve.

17. The method of claim 14, wherein generating the seismic signal with the seismic source further comprises:
obtaining a feedback signal indicative of relative motion between a mass and a baseplate of the seismic source, and
adjusting the primary control signal based on the feedback signal.

18. The method of claim 14, wherein the second hydraulic pressure comprises:
a first pressure measured from a first port of the controllable valve to a first chamber of the hydraulic actuator, and
a second pressure measured from a second port of the controllable valve to a second chamber of the hydraulic actuator.

19. The method of claim 14, wherein the primary control signal is based on hydraulic flow at the controllable valve, the hydraulic flow determined by a relationship between a gain in hydraulic flow, a displacement of a valve member, a first difference in supply and return pressures, and a second difference in control pressure to chambers of the hydraulic actuator.

20. The method of claim 19, wherein the hydraulic flow is defined as $$Q = K \times X_V \sqrt{\left(P_S - \left(\frac{X_V}{|X_V|}\right) \times P_L\right)},$$

wherein Q is the hydraulic flow through the controllable valve, K is the gain in hydraulic flow, $X_V$ is the displacement of the valve member, $P_S$ is the first difference, and $P_L$, is the second difference.

21. The method of claim 14, wherein the feed-forward signal used to adjust the primary control signal is based on a gain signal, the gain signal determined by a relationship between a displacement of a valve member at the controllable valve, a first difference in supply and return pressures at the controllable valve, and a second difference in control pressures at the controllable valve to chambers of the hydraulic actuator.

22. The method of claim 21, wherein the gain signal is defined as $$C = \frac{K_2}{\left(\sqrt{P_S - \frac{X_V}{|X_V|}P_L}\right) + \varepsilon},$$

wherein C is a control gain, $K_2$ is a square root of a difference between a supply pressure and a return pressure, c is a positive number limiting a maximum gain value, $X_V$ is the displacement of the valve member, $P_S$ is the first difference, $P_L$, is the second difference, and $P_S > |P_L|$.

23. The method of claim 14, further comprising:
obtaining feedback of an operating parameter during operation of the seismic source;
readjusting the feed-forward signal based on the obtained feedback; and
controlling the seismic source using the readjusted feed-forward signal.

24. The method of claim 23, wherein obtaining feedback comprises obtaining one or more of: a current to a motor of the controllable valve, a displacement of a valve member at the controllable valve, and a current supply pressure and a current control pressure.

25. A seismic signal generation method, comprising:
generating a primary control signal for controlling a controllable valve of a seismic source, the primary control signal operating the controllable valve, the controllable valve controlling hydraulic pressure for a hydraulic actuator of the seismic source, the hydraulic actuator generating a seismic signal;
obtaining initial parameters at the controllable valve in advance of operation of the seismic source, the initial parameters including a first hydraulic pressure between the controllable valve and a hydraulic supply and including second hydraulic pressures measured from first and second ports of the controllable valve to first and second chambers of the hydraulic actuator;

generating a feed-forward signal by processing the initial parameters obtained;

adjusting the primary control signal for the controllable valve with the feed-forward signal; and generating a seismic signal with the seismic source having at least partially removed harmonic distortion by operating the controllable valve with the adjusted control signal.

26. The method of claim 25, wherein the primary control signal comprises a sinusoid signal having a variable frequency.

27. The method of claim 25, wherein the controllable valve comprises a servo valve.

28. The method of claim 25, wherein generating the seismic signal with the seismic source further comprises:

obtaining a feedback signal indicative of relative motion between a mass and a baseplate of the seismic source, and adjusting the primary control signal based on the feedback signal.

29. The method of claim 25, wherein the primary control signal is based on hydraulic flow at the controllable valve, the hydraulic flow determined by a relationship between a gain in hydraulic flow, a displacement of a valve member, a first difference in supply and return pressures, and a second difference in control pressure to chambers of the hydraulic actuator.

30. The method of claim 29, wherein the hydraulic flow is defined as $$Q = K \times X_V \sqrt{\left(P_S - \left(\frac{X_V}{|X_V|}\right) \times P_L\right)},$$

wherein Q is the hydraulic flow through the controllable valve, K is the gain in hydraulic flow, $X_V$ is the displacement of the valve member, $P_S$ is the first difference, and $P_L$ is the second difference.

31. The method of claim 25, wherein the feed-forward signal used to adjust the primary control signal is based on a gain signal, the gain signal determined by a relationship between a displacement of a valve member at the controllable valve, a first difference in supply and return pressures at the controllable valve, and a second difference in control pressures at the controllable valve to chambers of the hydraulic actuator.

32. The method of claim 31, wherein the gain signal is defined as $$C = \frac{K_2}{\left(\sqrt{P_S - \frac{X_V}{|X_V|} P_L}\right) + \varepsilon},$$

wherein C is a control gain, $K_2$ is a square root of a difference between a supply pressure and a return pressure, c is a positive number limiting a maximum gain value, $X_V$ is the displacement of the valve member, $P_S$ is the first difference, $P_L$ is the second difference, and $P_S > |P_L|$.

33. The method of claim 25, further comprising:

obtaining feedback of an operating parameter during operation of the seismic source;

readjusting the feed-forward signal based on the obtained feedback; and controlling the seismic source using the readjusted feed-forward signal.

34. The method of claim 33, wherein obtaining feedback comprises obtaining one or more of: a current to a motor of the controllable valve, a displacement of a valve member at the controllable valve, and a current supply pressure and a current control pressure.

35. A seismic signal generation method, comprising:

generating a primary control signal for controlling a controllable valve of a seismic source, the primary control signal operating the controllable valve, the controllable valve controlling hydraulic pressure for a hydraulic actuator of the seismic source, the hydraulic actuator generating a seismic signal;

obtaining initial parameters at the controllable valve in advance of operation of the seismic source;

generating a feed-forward signal by processing the initial parameters obtained;

adjusting the primary control signal for the controllable valve with the feed-forward signal; and generating a seismic signal with the seismic source having at least partially removed harmonic distortion by operating the controllable valve with the adjusted control signal, wherein the primary control signal is based on hydraulic flow at the controllable valve, the hydraulic flow determined by a relationship between a gain in hydraulic flow, a displacement of a valve member, a first difference in supply and return pressures, and a second difference in control pressure to chambers of the hydraulic actuator.

36. The method of claim 35, wherein the primary control signal comprises a sinusoid signal having a variable frequency.

37. The method of claim 35, wherein the controllable valve comprises a servo valve.

38. The method of claim 35, wherein generating the seismic signal with the seismic source further comprises:

obtaining a feedback signal indicative of relative motion between a mass and a baseplate of the seismic source, and adjusting the primary control signal based on the feedback signal.

39. The method of claim 35, wherein obtaining initial parameters at the controllable valve comprises:

obtaining a first hydraulic pressure between the controllable valve and a hydraulic supply, and obtaining a second hydraulic pressure between the controllable valve and the hydraulic actuator.

40. The method of claim 35, wherein the hydraulic flow is defined as $$Q = K \times X_V \sqrt{\left(P_S - \left(\frac{X_V}{|X_V|}\right) \times P_L\right)},$$

wherein Q is the hydraulic flow through the controllable valve, K is the gain in hydraulic flow, $X_V$ is the displacement of the valve member, $P_S$ is the first difference, and $P_L$ is the second difference.

41. The method of claim 35, wherein the feed-forward signal used to adjust the primary control signal is based on a gain signal, the gain signal determined by a relationship between a displacement of a valve member at the controllable valve, a first difference in supply and return pressures at the controllable valve, and a second difference in control pressures at the controllable valve to chambers of the hydraulic actuator.

42. The method of claim 41, wherein the gain signal is defined as $$C = \frac{K_2}{\left(\sqrt{P_S - \frac{X_V}{|X_V|}P_L}\right) + \varepsilon},$$

wherein C is a control gain, $K_2$ is a square root of a difference between a supply pressure and a return pressure, c is a positive number limiting a maximum gain value, $X_V$ is the displacement of the valve member, $P_S$ is the first difference, $P_L$, is the second difference, and $P_S > |P_L|$.

43. The method of claim 35, further comprising:
obtaining feedback of an operating parameter during operation of the seismic source;
readjusting the feed-forward signal based on the obtained feedback; and
controlling the seismic source using the readjusted feed-forward signal.

44. The method of claim 43, wherein obtaining feedback comprises obtaining one or more of: a current to a motor of the controllable valve, a displacement of a valve member at the controllable valve, and a current supply pressure and a current control pressure.

45. A seismic signal generation method, comprising:
generating a primary control signal for controlling a controllable valve of a seismic source, the primary control signal operating the controllable valve, the controllable valve controlling hydraulic pressure for a hydraulic actuator of the seismic source, the hydraulic actuator generating a seismic signal;
obtaining initial parameters at the controllable valve in advance of operation of the seismic source;
generating a feed-forward signal by processing the initial parameters obtained;
adjusting the primary control signal for the controllable valve with the feed-forward signal; and
generating a seismic signal with the seismic source having at least partially removed harmonic distortion by operating the controllable valve with the adjusted control signal,
wherein the feed-forward signal used to adjust the primary control signal is based on a gain signal, the gain signal determined by a relationship between a displacement of a valve member at the controllable valve, a first difference in supply and return pressures at the controllable valve, and a second difference in control pressures at the controllable valve to chambers of the hydraulic actuator.

46. The method of claim 45, wherein the primary control signal comprises a sinusoid signal having a variable frequency.

47. The method of claim 45, wherein the controllable valve comprises a servo valve.

48. The method of claim 45, wherein generating the seismic signal with the seismic source further comprises:
obtaining a feedback signal indicative of relative motion between a mass and a baseplate of the seismic source, and
adjusting the primary control signal based on the feedback signal.

49. The method of claim 45, wherein obtaining initial parameters at the controllable valve comprises:
obtaining a first hydraulic pressure between the controllable valve and a hydraulic supply, and
obtaining a second hydraulic pressure between the controllable valve and the hydraulic actuator.

50. The method of claim 45, wherein the gain signal is defined as $$C = \frac{K_2}{\left(\sqrt{P_S - \frac{X_V}{|X_V|}P_L}\right) + \varepsilon},$$

wherein C is a control gain, $K_2$ is a square root of a difference between a supply pressure and a return pressure, c is a positive number limiting a maximum gain value, $X_V$ is the displacement of the valve member, $P_S$ is the first difference, $P_L$, is the second difference, and $P_S > |P_L|$.

51. The method of claim 45, further comprising:
obtaining feedback of an operating parameter during operation of the seismic source;
readjusting the feed-forward signal based on the obtained feedback; and
controlling the seismic source using the readjusted feed-forward signal.

52. The method of claim 50, wherein obtaining feedback comprises obtaining one or more of: a current to a motor of the controllable valve, a displacement of a valve member at the controllable valve, and a current supply pressure and a current control pressure.

* * * * *